(12) United States Patent
Casarotto

(10) Patent No.: US 6,196,759 B1
(45) Date of Patent: Mar. 6, 2001

(54) SYSTEM FOR COUPLING A SHAFT AND A BLIND, HOLLOW MEMBER, PARTICULARLY FOR EPICYCLIC REDUCTION GEARS

(75) Inventor: Giorgio Casarotto, Via Coatelle, 426/B - 45021, Badia Polesine (RO) (IT)

(73) Assignees: Giorgio Casarotto; Brevini Veneta S.R.L., both of Radia Polesine (IT)

( * ) Notice: Subject to any disclaimer, the term of this patent is extended or adjusted under 35 U.S.C. 154(b) by 0 days.

(21) Appl. No.: 09/231,059

(22) Filed: Jan. 14, 1999

(30) Foreign Application Priority Data

Jan. 15, 1998 (IT) .............................................. PD98A0007

(51) Int. Cl.7 ...................................................... F16B 2/02
(52) U.S. Cl. ............................................ 403/373; 403/337
(58) Field of Search ...................................... 403/337, 373, 403/370, 374.3, 374.4, 356, 355, 371, 336, 16, 375; 475/331

(56) References Cited

U.S. PATENT DOCUMENTS

| | | | |
|---|---|---|---|
| 2,516,472 | * 7/1950 | MacKeage, Jr. | ..................... 403/336 |
| 3,119,625 | * 1/1964 | Marr | .................................. 403/370 X |
| 3,454,313 | * 7/1969 | Lohneis | ............................. 403/370 X |
| 3,638,974 | * 2/1972 | Stratienko | ......................... 403/371 X |
| 3,803,691 | * 4/1974 | Geese et al. | .................... 403/374.4 X |
| 3,887,290 | * 6/1975 | Taylor | .................................... 403/370 |
| 4,311,224 | * 1/1982 | Kato et al. | ...................... 403/374.4 X |
| 4,452,547 | * 6/1984 | Thiel et al. | ............................ 403/370 |
| 5,174,680 | * 12/1992 | Nakamura et al. | ................... 403/370 |

* cited by examiner

Primary Examiner—Harry C. Kim
(74) Attorney, Agent, or Firm—Sughrue, Mion, Zinn, Macpeak & Seas, PLLC

(57) ABSTRACT

A system for coupling a shaft and a hollow member with a blind seat coaxial therewith for housing an end portion of the shaft includes torsional coupling elements and axial coupling elements between the shaft and the member. The axial coupling elements include an annular element coaxial with the shaft and slidable relative thereto, a first shoulder which is formed on the shaft and can interfere with the annular element, and a connection device for connecting the annular element to the member in order to restrain the annular element against the first shoulder and to fix the shaft axially relative to the hollow member.

12 Claims, 3 Drawing Sheets

Figure 1:
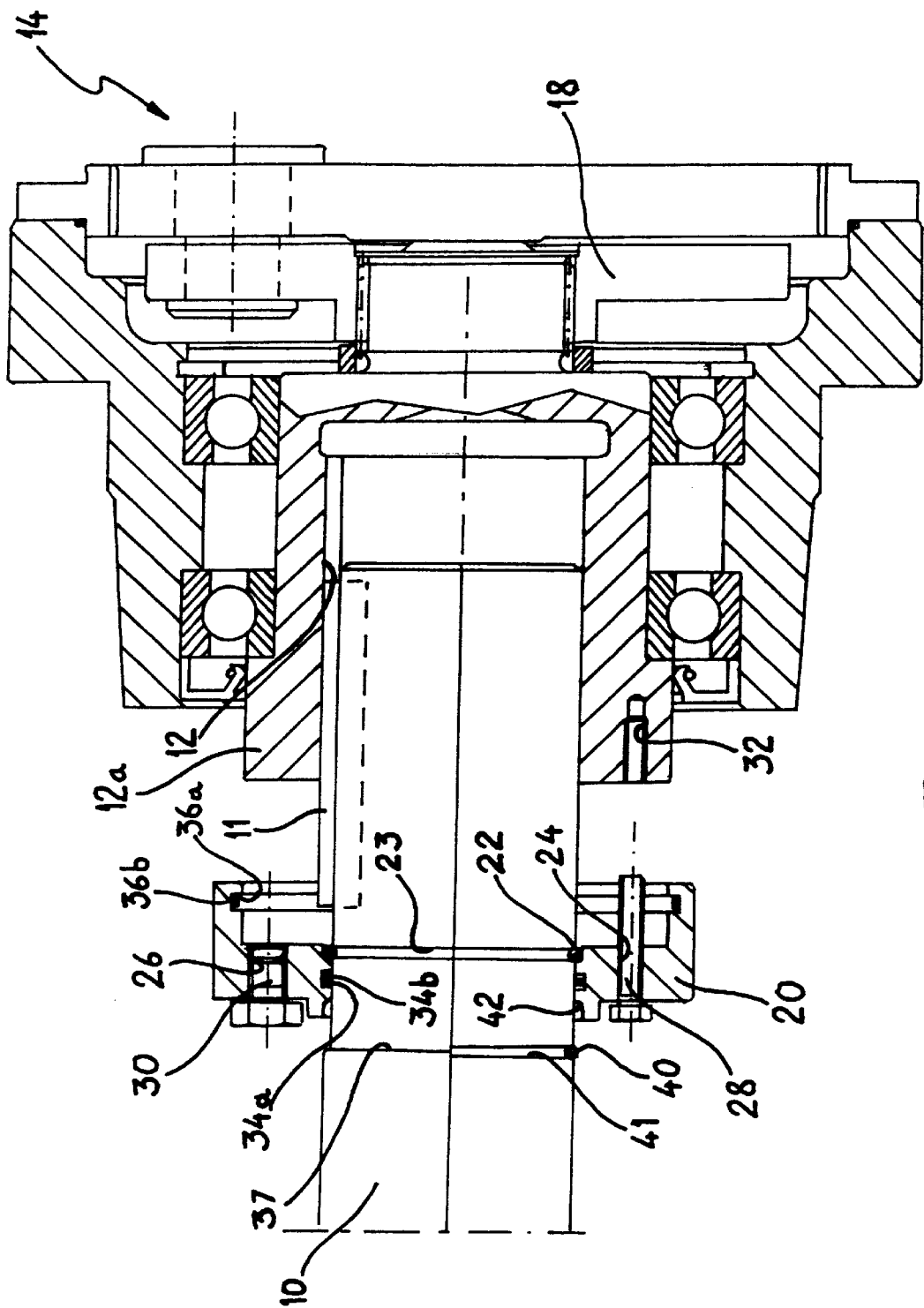

SYSTEM FOR COUPLING A SHAFT AND A BLIND, HOLLOW MEMBER, PARTICULARLY FOR EPICYCLIC REDUCTION GEARS

DESCRIPTION

The present invention relates to a system for coupling a shaft and a blind, hollow member according to the preamble to the main claim.

A coupling of the above-mentioned type is required, for example, in the assembly of a machine comprising a rotary shaft an end portion of which is intended to engage a blind seat of a hollow member coaxial with the shaft and fixed for rotation with a spider or with a sun gear of an epicyclic reduction gear.

A coupling of this type between the parts mentioned has to ensure the transmission of a twisting moment between the shaft and the blind, hollow member whilst locking them together axially.

Naturally, this latter characteristic is required to prevent disassembly of the parts or annoying vibrations in the unit. In particular, the operative situation in which a transmission shaft is housed in a blind, hollow member does not permit easy axial fixing of the shaft at both of its axial ends as in couplings with hollow members having through holes.

A first known coupling system provides for the use of friction clamping or shrunk-on joints fitted on the blind, hollow member externally in the region of the seat housing the rotary shaft.

Tightening of the friction joint brings about both torsional and axial locking between the shaft and the hollow member. However, this system requires a fairly precise coupling between the parts and has the disadvantage of leading to damage of the shafts coupled when there are large overloads. Moreover, the large clamping force, together with impurities which are deposited in the coupling region during the operative life of the machine, tend to weld the coupling surfaces together, in many cases making their disconnection substantially impossible without irreparable damage to the parts concerned.

Finally, the use of friction joints involves costs which render the coupling system as a whole economically unfavourable.

A second known system for coupling a shaft and a blind, hollow member provides for the use of locking grub screws for fixing them axially. These screws are normally screwed into radial holes in the hollow member in the region of the seats for housing the shaft and clamped against the surface of the shaft.

This system is quite easy to produce but has not been found very effective in clamping shafts axially where large forces are involved.

The problem upon which the present invention is based is to provide a system for coupling a shaft and a blind, hollow member, which is designed structurally and functionally to overcome all of the problems complained of with reference to the prior art mentioned.

This problem is solved by the invention by means of a coupling system formed in accordance with the following claims.

Figure 3:
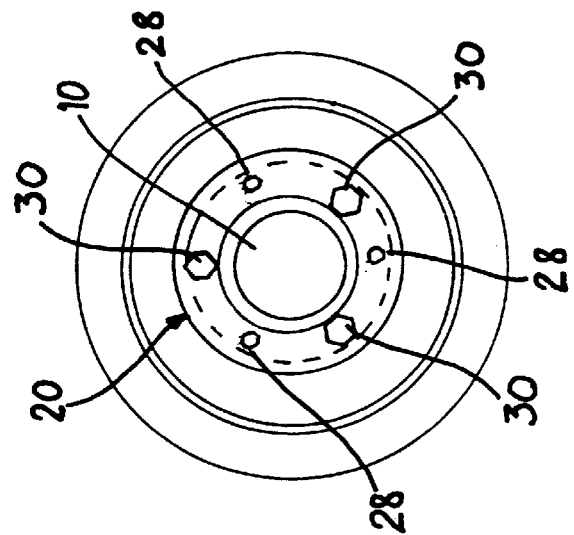
Figure 2:
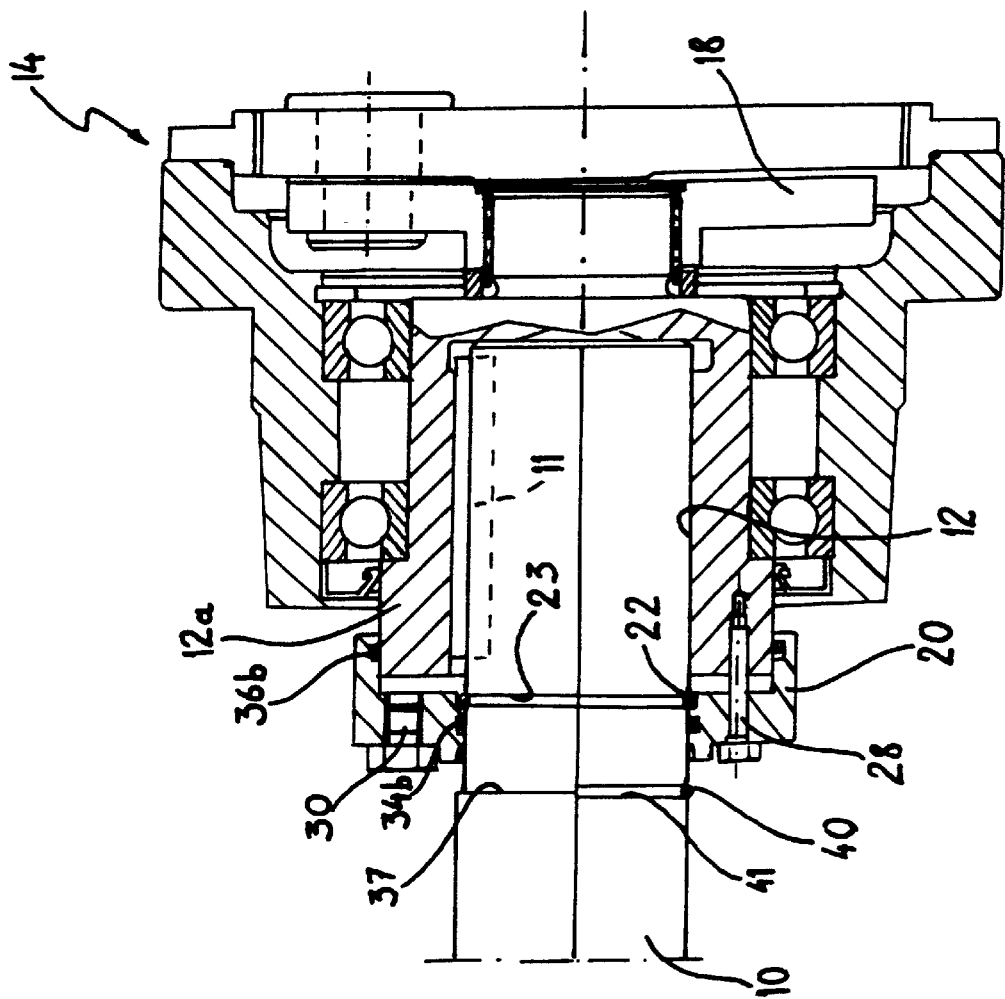
Figure 4:
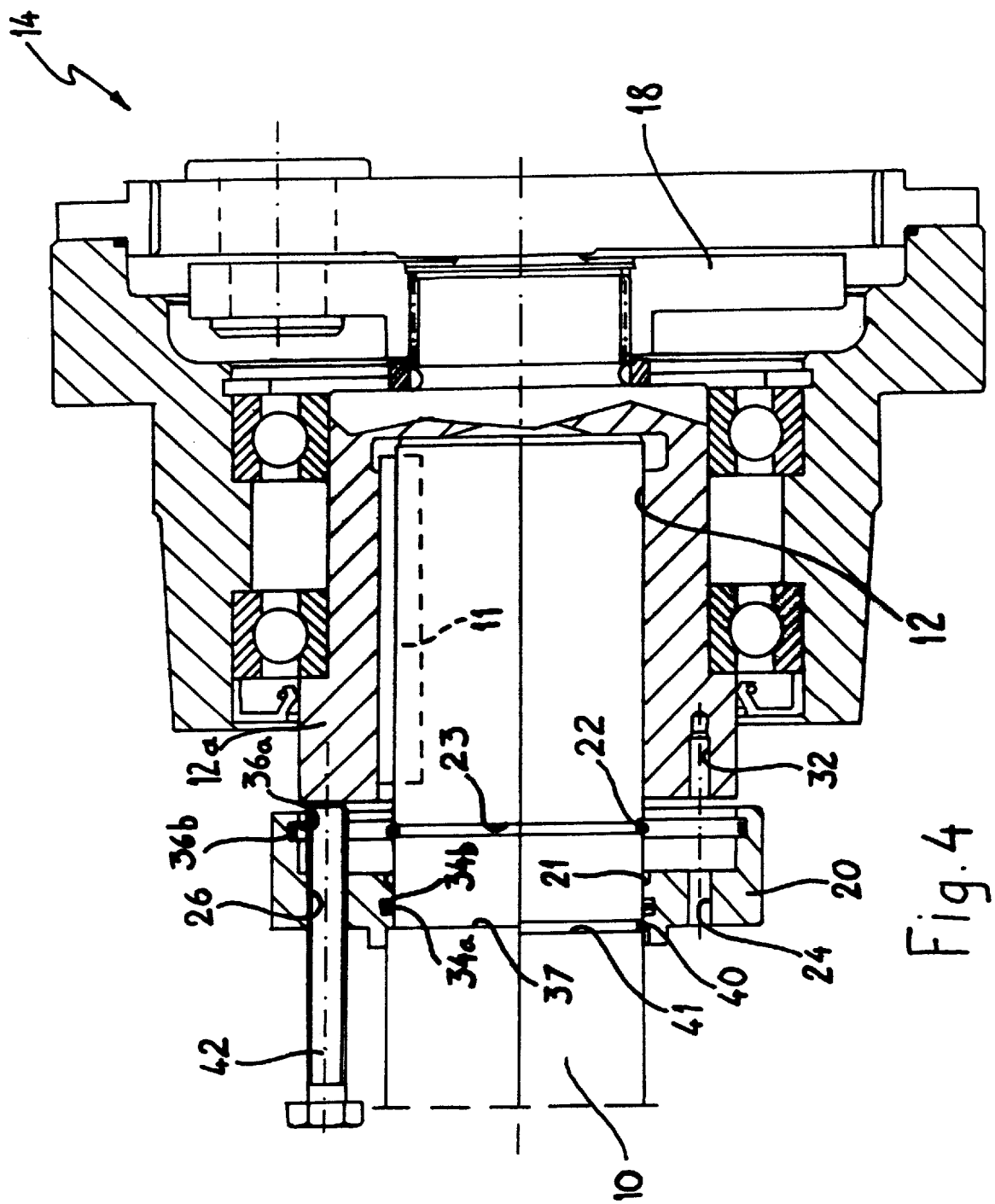

The characteristics and advantages of the invention will become clearer from the detailed description of an embodiment thereof given by way of non-limiting example, with reference to the appended drawings, in which:

FIG. 1 is a partial longitudinal section of a coupling system according to the invention, in an assembly stage, FIG. 2 is a partial longitudinal section of the assembled coupling system, FIG. 3 is a front view of the assembled coupling system, and FIG. 4 is a partial longitudinal section of the coupling system, in a disassembly stage.

The embodiment described below relates to the coupling of a rotary transmission shaft to an epicyclic reduction gear and, in particular, to a blind, hollow member fixed for rotation with the spider of the reduction gear.

With reference to FIG. 1, a rotary transmission shaft, indicated 10, is intended to be inserted in a blind seat 12 in a hollow member 12a of an epicyclic reduction gear 14.

The seat 12 is coaxial with the shaft 10 and is generally cup-shaped so as to house an end portion of the shaft 10. The blind, hollow member 12a is fixed for rotation with a spider element 18 of the epicyclic reduction gear 14.

Torsional coupling between the shaft 10 and the hollow member 12a is achieved by means of a tongue 11 which enables a twisting moment to be transmitted between the shaft 10 and the epicyclic reduction unit 14.

In FIG. 1, the set of parts is shown during an assembly stage when the shaft 10 is only partially inserted in the blind seat 12 of the hollow member.

An annular element 20 is mounted for sliding coaxially on the shaft 10. A spring ring 22, generally a Seeger ring, is disposed in an annular groove 23 formed on the shaft, thus defining on the shaft a first shoulder which can interfere with the annular element 20 during its movement along the shaft.

An annular surface 21 which can interfere with the portion of the ring 22 which projects from the shaft 10 is advantageously defined in the element 20.

The element 20 also has a plurality of first and second through-holes indicated 24 and 26, respectively. Only two of these are shown in the section plane of FIG. 1. These through-holes are disposed in a generally annular arrangement and are spaced apart angularly at regular intervals and intercalated with one another.

The holes 24, 26 house respective pluralities of first connection screws 28 and second screws 30. The screws 30 serve as elements for closing the holes 26, the function of which will be described in detail below.

Respective blind threaded holes 32, of which only one is shown in FIG. 1, are formed in the blind, hollow member 12a in positions corresponding to and facing the holes 24, for engagement by the screws 28.

Two annular grooves 34a, 36a are also formed in the annular element 20 for housing two respective sealing rings 34b, 36b. These sealing rings are in contact with the shaft 10 and with the hollow member 12a, respectively, so as to ensure that the coupling region is leaktight when coupling has taken place.

A second shoulder, generally indicated 37 is advantageously provided on the shaft 10 for interfering with the annular element 20 during the disconnection of the shaft 10 from the hollow member 12a. This shoulder 37 is defined by an extension of the shaft 10 with a larger diameter than the end portion (the upper half of the drawing of FIG. 1). Alternatively, the shoulder 37 is formed by a second Seeger ring 40 disposed in an annular groove 41 formed on the shaft 10 (the lower half of the drawing of FIG. 1).

The shoulder 37 can interfere with the annular element 20 during its sliding relative to the shaft 10 and, in particular, with an annular surface 42 formed thereon.

The operation of the system during coupling, when assembled, and during disconnection is described in detail below with reference to FIGS. 1, 2 and 4, respectively.

FIG. 1 shows the shaft 10 partially inserted in the blind seat 12. The annular element 20 is positioned in a manner such that the connection screws 28 are disposed opposite the holes 32 in the hollow member.

The position of the first shoulder 22 is selected at a distance such that, when the shaft is fully inserted, the connection screws 28 can be tightened in the holes 32 so as to fix the shaft 10 axially in the blind seat 12.

Axial movement of the shaft 10 relative to the member 12a is therefore prevented in one direction by the end of the blind seat 12 and in the other direction by the abutment between the Seeger ring 22 and the annular element 20 clamped to the hollow member 12a. In this coupling position, the rings 34b, 36b ensure that the seat 12 of the shaft 10 is leaktight, protecting the coupling surfaces from contact with oxidizing agents or external impurities such as to jeopardize their subsequent disconnection.

The system according to the invention enables the shaft 10 and the member 12a to be disconnected easily as described below with reference to FIG. 4.

The screws 28 are first of all disengaged from the holes 24 so as to release the annular element 20 from the member 12a. The screws 30 are disengaged from the holes 26 and, in their place, respective operating screws 42, longer than the screws 20, are screwed into these holes.

The operating screws 42 are then screwed into the second holes 26 until their free ends are brought into abutment with the outer radial surface of the hollow member 12a.

Further tightening of the operating screws 42 brings about axial sliding of the annular element 20 relative to the shaft 10 away from the hollow member 12a, to a position (FIG. 4) in which the annular element is brought to interfere with the second shoulder. From this position, further tightening of the screws 42 causes the shaft 10 to slide out of the blind seat 12, together with the annular element 20.

It should be noted that the alternating arrangement of the connection screws and the operating screws 42 at regular intervals, as shown in FIG. 3, together with the tightening operations performed on the screws uniformly, enable coupling and disconnection to be carried out without any misalignment between the shaft and the annular element.

Naturally, the principle of the invention remaining the same, the forms of embodiment and details of construction may be varied widely with respect to those described and illustrated purely by way of non-limiting example, without thereby departing from the scope of the invention as defined in the appended claims.

What is claimed is:

1. A system, for coupling a shaft and a hollow member including a blind seat coaxial with the shaft for housing an end portion of the shaft, comprising torsional coupling means and axial coupling means between the shaft and the member, wherein the torsional coupling means and axial coupling means are independent from each other, and wherein the axial coupling means comprise:
    an annular element adapted to be mounted on the shaft for sliding on the shaft;
    means for connecting the annular element to the member; and
    a first shoulder on the shaft for interfering with the annular element as a result of the connection of the annular element to the member, so that the shaft is fixed axially in the seat, relative to the member.

2. A system according to claim 1, characterized in that the connecting means comprise a plurality of connection screws extending through respective first holes in the annular element for engagement in a plurality of corresponding holes formed in the member.

3. A system according to claim 2, characterized in that the connection screws are disposed in a generally annular arrangement and are spaced apart angularly.

4. A system according to claim 3, characterized in that the screws are spaced apart uniformly.

5. A system according to claim 1, characterized in that the first shoulder comprises a spring ring housed in a corresponding first annular groove formed on the shaft.

6. A system according to claim 1, characterized in that the system comprises sealing means between the shaft and the annular element and between the member and the annular element so as to render the blind seat leaktight.

7. A system according to claim 6, characterized in that the sealing means comprise a pair of sealing rings mounted in the annular element and in contact with the shaft and with the member, respectively.

8. A system according to claim 1, characterized in that it further comprises:
    a second shoulder formed on the shaft for interfering with the annular element as it slides in a direction away from the member, means being provided between the annular element and the member for extracting the shaft from the seat in order to disconnect the annular element and the shaft from the member.

9. A system according to claim 8, characterized in that the extraction means comprise a plurality of operating screws which are engaged by screwing in respective through-holes of the annular element and which can come into abutment with the hollow member.

10. A system according to claim 8, characterized in that the extraction means are disposed in a generally annular arrangement with uniform angular spacing.

11. A system according to claim 8, characterized in that the second shoulder comprises a second spring ring disposed in a corresponding second annular groove formed in the shaft.

12. A system according to claim 1, characterized in that the system comprises a plurality of closure elements for sealingly engaging the annular element when the shaft is in the coupled condition in the seat so as to ensure that the seat is leaktight.

* * * * *